United States Patent
Zhang

(10) Patent No.: US 9,807,388 B2
(45) Date of Patent: Oct. 31, 2017

(54) ADAPTIVE INTRA-REFRESHING FOR VIDEO CODING UNITS

(71) Applicant: Avago Technologies General IP (Singapore) Pte. Ltd., Singapore (SG)

(72) Inventor: Lei Zhang, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 889 days.

(21) Appl. No.: 13/662,976

(22) Filed: Oct. 29, 2012

(65) Prior Publication Data

US 2014/0119434 A1    May 1, 2014

(51) Int. Cl.
*H04N 19/107*   (2014.01)
*H04N 19/176*   (2014.01)
*H04N 19/147*   (2014.01)

(52) U.S. Cl.
CPC ......... *H04N 19/107* (2014.11); *H04N 19/176* (2014.11); *H04N 19/147* (2014.11)

(58) Field of Classification Search
None
See application file for complete search history.

(56) References Cited

U.S. PATENT DOCUMENTS

| | | | | |
|---|---|---|---|---|
| 2007/0263722 | A1* | 11/2007 | Fukuzawa | H04N 19/159 375/240.12 |
| 2008/0127258 | A1* | 5/2008 | Walker | H04N 7/163 725/39 |
| 2009/0086816 | A1* | 4/2009 | Leontaris | H04N 19/176 375/240.03 |
| 2012/0057631 | A1* | 3/2012 | Le Leannec | H04N 19/56 375/240.16 |
| 2013/0216201 | A1* | 8/2013 | Seligmann | H04N 5/783 386/241 |

* cited by examiner

*Primary Examiner* — Chikaodili E Anyikire
(74) *Attorney, Agent, or Firm* — Foley & Lardner LLP

(57) ABSTRACT

The present disclosure relates to the use of adaptive intra-refreshing of video coding units to improve video perceptive quality by reducing artifacts such as I-pulsing. A picture to be encoded as an inter-coded picture is received from a video stream. A coding unit of the picture is encoded using an inter-predicted mode or an intra-predicted mode, where the mode is selected according to a selection function applied to the coding unit. The selection function is biased based at least in part on a temporal distance between the picture and a nearest intra-coded picture in the video stream. In various embodiments, bit rate, distortion from prediction errors, quantization factors and differences between pictures, content information, hypothetical reference decoder buffer information, group of pictures length, position of the coding unit, and/or other information may be factors employed in the selection function.

20 Claims, 5 Drawing Sheets

ADAPTIVE INTRA-REFRESHING FOR VIDEO CODING UNITS

BACKGROUND

A digital video stream may be partitioned into successive groups of pictures (GOPs), where each picture or frame in the GOP may be of a pre-defined picture coding type. Such digital video streams may conform to the Moving Pictures Experts Group (MPEG)-2 standard, the MPEG-4 advanced video coding (AVC)/H.264 standard, the emerging high efficiency video coding (HEVC) standard, and/or other formats. The picture coding types may comprise intra-coded pictures, unidirectional-predicted pictures, and bidirectional-predicted pictures. The intra-coded pictures, or I-pictures, may only use the information within the picture to perform video compression or encoding. These self-contained I-pictures provide a base value or anchor that is a prediction of the value of succeeding pictures. Each GOP may generally start with a self-contained I-picture as the reference or anchor frame from which the other frames in the group may be generated for display by a decoder or for reconstruction by an encoder. A GOP may start with an I-picture when describing the transmission, decoding, and/or processing order of a picture sequence, for example.

The GOP frequency, and correspondingly the frequency or periodicity of I-pictures, may be driven by specific application spaces. The predicted, or P-pictures, may use a motion estimation scheme that generates motion vectors that may be utilized to predict picture elements from previously encoded pictures. Compressing or encoding the difference between predicted samples and the source value results in better coding efficiency than that which may be achieved by transmitting the encoded version of the source picture information. At a receiver or decoder side, the compressed or encoded difference picture is decoded and subsequently added to a predicted picture for display.

The bidirectional-predicted pictures, or B-pictures, may use multiple pictures that occur in a future location in the GOP and/or in a past location in the GOP to predict the image samples. As with P-pictures, motion estimation may be used for pixel prediction in B-pictures and the difference between the original source and the predicted pictures may be compressed. At the receiver, or decoder, end, one or more B-pictures may be motion compensated and may be added to the decoded version of the compressed difference signal for display. Since both the P-pictures and B-pictures may be based on other pictures, they may be referred to as inter-coded pictures.

In the AVC standard, instead of B-picture, P-picture, and I-picture types, the type definitions are made slice-wise, where a slice may cover an entire picture. However, it is commonly accepted practice to refer to I-pictures as pictures which only contain intra-coded or I-slices, P-pictures as pictures which may contain predicted slices (P-slices) or I-slices, and B-pictures as pictures which may contain bi-directional or bi-predictive slices (B-slices), P-slices, or I-slices. In the AVC standard, the B-pictures may also be used for prediction, further complicating the decoding dependency between pictures in a bit stream.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to adaptive intra-refreshing for coding units in video coding. As used herein, the term "coding unit" may refer to a macroblock or any other pixel group that may be employed within various video coding approaches. In intra-coded pictures (e.g., I-pictures), all of the coding units are intra-predicted. Such intra-predicted coding units may be predicted based at least in part on other coding units within the same picture using neighboring reconstructed pixels, but do not depend on data in other pictures in the video stream. By contrast, in inter-coded pictures (e.g., P-pictures and B-pictures), coding units may be intra-predicted or inter-predicted. Inter-predicted coding units do depend on data from other pictures in the video stream.

One advantage to inter-prediction over intra-prediction is greater compression efficiency. However, due to the data dependency, pictures relying on inter-prediction are less resilient to data loss. Moreover, coding a group of pictures that comprise intra- and inter-predicted pictures may be susceptible to a specific type of artifact called I-pulsing. I-pulsing results from a visually perceptible difference between an intra-coded picture and an inter-coded picture. Various embodiments of the present disclosure are configured to reduce I-pulsing artifacts in video coding by biasing the decision to use either intra-prediction or inter-prediction for a coding unit in an inter-coded picture. For example, in one embodiment, intra-prediction may be more likely to be used when the picture is temporally adjacent to or otherwise near an intra-coded picture. In the following discussion, a general description of the system and its components is provided, followed by a discussion of the operation of the same.

Figure 1A:
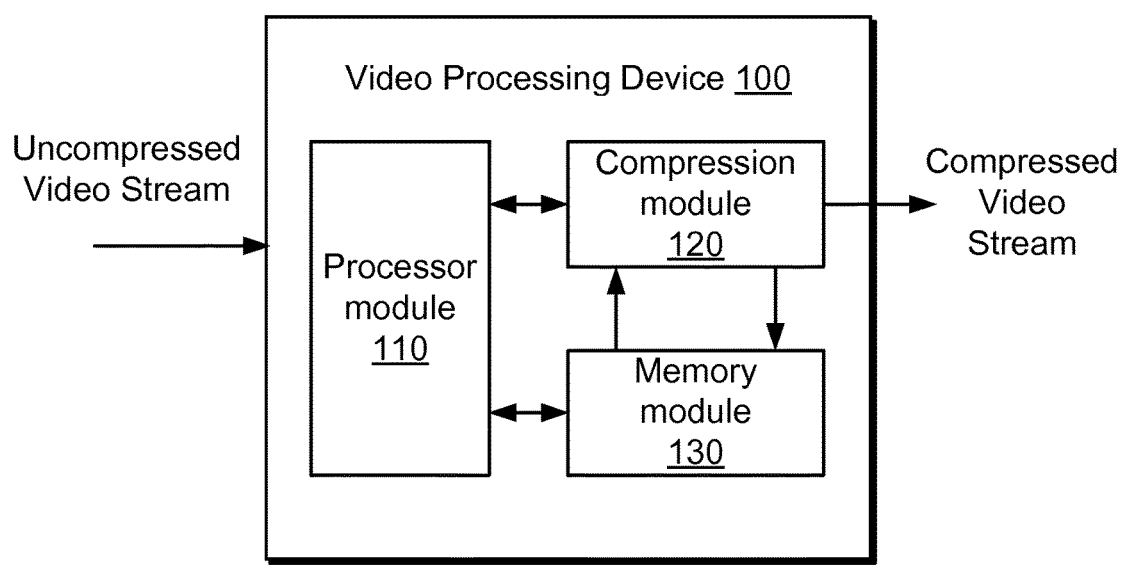
FIG. 1A is a diagram that illustrates an exemplary video processing device that is operable to generate a compressed video stream according to various embodiments of the present disclosure.

FIG. 1A is a diagram that illustrates an exemplary video processing device that is operable to generate a compressed video stream according to various embodiments of the present disclosure. Referring to FIG. 1A, there is shown a video processing device 100 that may comprise a processor module 110, a compression module 120, and a memory module 130. The video processing device 100 may be utilized to process video images or pictures, such as frames of a video stream. The images may be captured by the video processing device 100 or may be captured by another device and communicated to the video processing device 100 for processing. For example, uncompressed video may be communicated to the video processing device 100 from an external device and/or through a network. Some or all of the components or modules of the video processing device 100 may be comprised within a single integrated circuit and/or may be integrated on a single substrate.

Figure 1B:
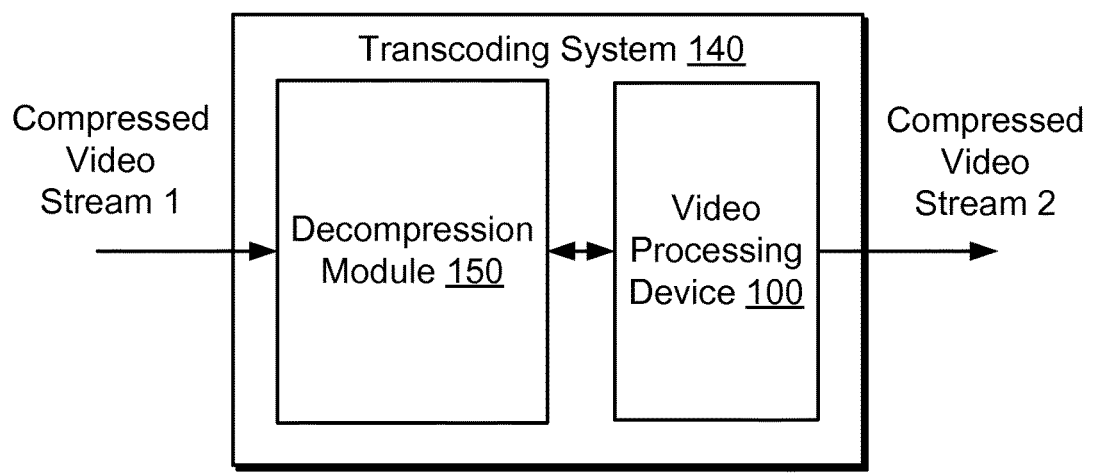
FIG. 1B is a diagram that illustrates an exemplary transcoding system that is operable to generate a compressed video stream using the video processing device of FIG. 1A according to various embodiments of the present disclosure.

FIG. 1B is a diagram that illustrates an exemplary transcoding system 140 that is operable to generate a compressed video stream using the video processing device 100 according to various embodiments of the present disclosure. The transcoding system 140 includes a decompression module 150, which may correspond to the processor module 110 (FIG. 1) or other circuitry. The decompression module 150 obtains a video stream compressed in a first format (shown as compressed video stream 1) and decompresses the video stream to generate an uncompressed video stream. The compression module 120 (FIG. 1A) in the video processing device 100 compresses the uncompressed video stream to generate a compressed video stream in a second format (shown as compressed video stream 2). It is understood that the principles described with reference to FIG. 1A are also applicable to the transcoding system 140 of FIG. 1B.

Referring back to FIG. 1A, the processor module 110 may comprise suitable logic, circuitry, code, and/or interfaces that may be operable to control at least some of the functions, operations, and/or modes of the compression module 120 and/or of the memory module 130. For example, the processor module 110 may control inter-prediction, intra-prediction, transform, quantization, and/or encoding operations performed by the compression module 120. The processor module 110 may also control a decoding data path, including inverse quantization, and/or inverse transform operations that may be performed by the compression module 120 to generate reconstructed pixels.

The processor module 110 may be operable to enable and/or disable one or more functions, operations, and/or modes of the compression module 120. The processor module 110 may base decisions, regarding which functions, operations, and/or modes to enable or disable, on the type of content being processed by the compression module 120.

The processor module 110 may be operable to control the update, storage, and/or retrieval of information from the memory module 130, and/or the manner in which such update, storage, and/or retrieval takes place. The processor module 110 may store and/or obtain information from the memory module 130 and/or may control the manner in which information is stored and/or obtained from the memory module 130 by another component and/or device.

The memory module 130 may comprise suitable logic, circuitry, and/or code that may be operable to store information that may be utilized by the compression module 120. The memory module 130 may store operating parameters such as prediction, transform, quantization, and/or coding parameters, pixel information such as luminance and chrominance values, and/or intermediate values such as the transform coefficients generated during image compression operations, for example. The memory module 130 may comprise multiple memory devices (not shown) or may be a single memory device.

The compression module 120 may comprise suitable logic, circuitry, code, and/or interfaces that are operable to compress video and/or still images. The compression module 120 may support one or more video compression formats such as H.264 or AVC, HEVC, and so on. In this regard, the compression module 120 may perform inter-prediction, intra-prediction, transform, quantization, and/or encoding operations on video and still images to produce a compressed video stream. The compression module 120 may also be operable to reconstruct blocks of pixels from encoded video. Those reconstructed blocks of pixels may be utilized in the compression of other blocks of pixels. Reconstruction operations may comprise inverse quantization and inverse transform operations.

The inter-prediction operations supported by the compression module 120 may utilize the temporal redundancy that may exist between video images. On the other hand, the intra-prediction operations supported by the compression module 120 may utilize the spatial redundancy that may exist within a video or still image. In one type of intra-prediction, a current block of pixels in video or still image may be predicted based on encoded and reconstructed pixels of the neighboring block. This type of intra-prediction may be referred to as directional prediction, used by conventional video compression methods such as H.264, also known as AVC, and image compression methods such as lossless Joint Photographic Experts Group (JPEG), also known as JPEG-LS.

Next, the operation of the video processing device 100 will be described. The processor module 110 obtains an uncompressed video stream. Such an uncompressed video stream may be read from a data store, captured from a video input device, obtained over a network, obtained by decoding a compressed video stream, and/or obtained from other sources. The uncompressed video stream corresponds to a sequence of frames, or pictures. The processor module 110 provides each of the frames to the compression module 120, e.g., by way of a buffer in the memory module 130.

The compression module 120 determines how each of the pictures in the buffer will be encoded. To begin, the compression module 120 may determine whether a picture is to be encoded as an intra-coded picture (I-picture) or an inter-coded picture. If the picture is to be encoded as an inter-coded picture, such a picture may be encoded as a P-picture, which is predicted based only on previous pictures in the video stream, or as a B-picture, which is bidirectionally predicted based on previous or later pictures in the video stream. Thus, the compression module 120 determines a group of pictures (GOP) structure. In various video coding approaches, a GOP structure is defined as beginning with an I-picture, which is followed by a number of P-pictures or B-pictures. The distance between I-pictures may be referred to as the GOP length.

A greater frequency of I-pictures allows for more resiliencies when the compressed video stream is transmitted over a lossy transmission medium. That is, the loss of data for surrounding frames does not affect the decoding of an I-picture. However, I-pictures require more data to be encoded. Thus, the frequency of I-pictures (and thus the GOP length) may be selected as a trade-off between loss recoverability and compressed video stream bit rate.

Figure 2A:
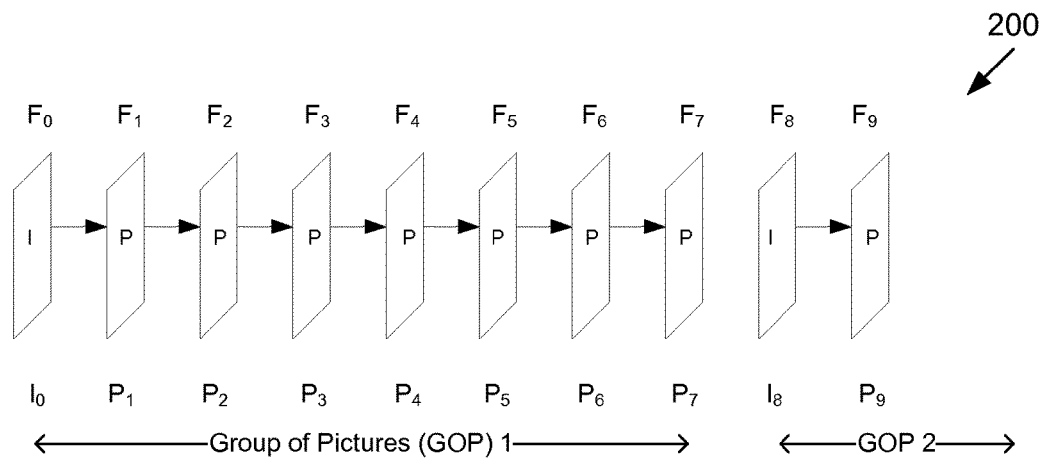
FIG. 2A illustrates an exemplary sequence of frames in a video stream processed by the exemplary video processing device of FIG. 1A according to an embodiment of the present disclosure.

FIG. 2A illustrates an exemplary sequence of frames 200 in a video stream processed by the video processing device 100 (FIG. 1A) according to an embodiment of the present disclosure. The sequence of frames in FIG. 2 corresponds to a first GOP ($F_0$-$F_7$) and at least a portion of a second GOP ($F_8$-$F_9$). Each GOP is defined by the location of an I-frame (e.g., $F_0$ and $F_8$), which are independently decodable because they use only the information present in that frame.

P-frames (e.g., $F_1$-$F_7$ and $F_9$) may use motion information from previous frames as well as the information present in that frame.

Figure 2B:
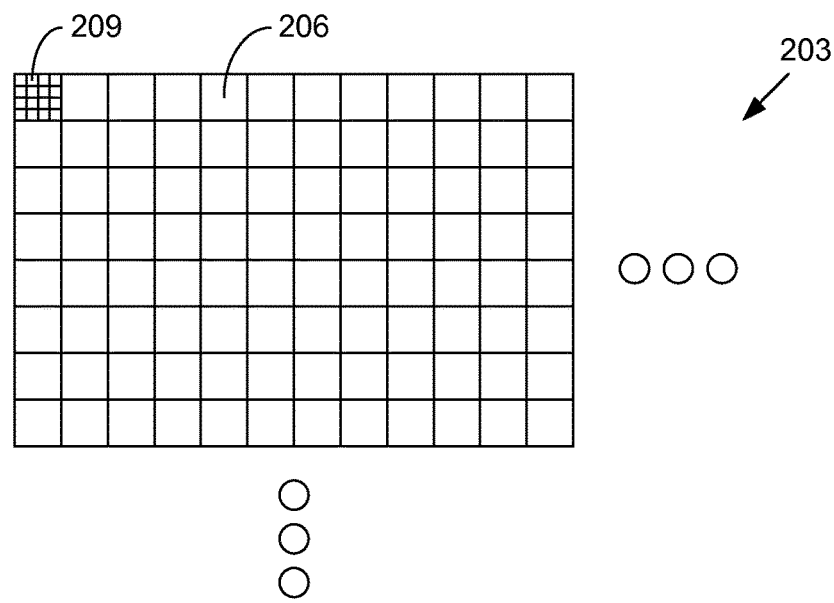
FIG. 2B illustrates an exemplary frame in a video stream processed by the video processing device of FIG. 1A according to an embodiment of the present disclosure.

After the GOP structure is determined, the compression module 120 is configured to determine the coding units in a picture. FIG. 2B illustrates an exemplary frame 203 in a video stream processed by the video processing device 100 (FIG. 1A) according to an embodiment of the present disclosure. The frame 203 is divided into a plurality of coding units 206, which are in turn divided into a plurality of pixels 209. The various operations described herein for the compression module 120 (FIG. 1A) may be carried out on pixel group coding units 206 generally referred to as macroblocks, which are typically 16×16 pixels in size but may be greater, e.g. 64×64 pixels. Various aspects associated with the processing of video images by the compression module 120, such as prediction or transform, may be performed on smaller coding unit 206 sizes, including 16×8, 8×16, 8×8, 8×4, 4×8, and 4×4, for example.

Referring back to FIG. 1A, the compression module 120 then compresses each one of the coding units using either an intra-predicted mode or an inter-predicted mode. If the picture is an I-picture, the compression module 120 compresses all of the coding units in the picture using the intra-predicted mode. If the picture is an inter-predicted picture (a P-picture or a B-picture), the compression module 120 determines whether each of the coding units is to be compressed using either an intra-predicted mode or an inter-predicted mode.

The compression module 120 may select the mode according to a selection function, which may in turn depend on an intra-prediction mode cost function and an inter-prediction mode cost function. First, the bit rate of the compressed video stream may be a limiting factor to the frequency of coding units that may be intra-predicted, as intra-predicted coding units may generally be less data efficient. Thus, the bit rate may be a factor in the selection function. Second, encoding the coding unit using inter-prediction instead of intra-prediction may result in perceptible artifacts or distortion that differ from that resulting from intra-prediction. The selection function may, for example, base a decision on the respective prediction errors associated with inter-prediction or intra-prediction and one or more thresholds.

For example, if the prediction error for inter-prediction is relatively low, the selection function may favor inter-prediction. Conversely, if the prediction error for inter-prediction is relatively high, the selection function may favor intra-prediction. Such a selection according to distortion may be influenced by bit rate controls. In other words, one prediction error for inter-prediction that may be acceptable when the encoding is not bit-rate constrained may be unacceptable when the encoding is bit-rate constrained. While considering bit rate, the selection function may be configured to select the mode having the minimum prediction error.

In various embodiments, the compression module 120 may be configured to with a selection function that is adaptive to reduce I-pulsing artifacts, which show a visually distracting jump from an inter-predicted picture where all coding units are inter-coded to an intra-predicted picture where all coding units are intra-coded. To this end, the selection function is configured to intentionally produce more intra-predicted coding units in inter-predicted pictures. To accomplish this, the selection function may be biased based at least in part on a temporal distance (i.e., the number of frames) between the inter-predicted picture and a nearest I-picture in the video stream. In other words, the selection function may be biased based at least in part on the relative location of the picture within a GOP. In one embodiment, the nearest I-picture considered is the subsequent I-picture, while in another embodiment, the nearest I-picture may be a subsequent or preceding I-picture. For example, in FIG. 2A, the temporal distance between $P_7$ and $I_8$ is one, while the temporal distance between $P_6$ and $I_8$ is two. The selection function may be more likely to perform intra-mode prediction in $P_7$ rather than $P_6$ because of the temporal distance between the picture and a nearest I-picture in the video stream.

To effect this biasing, a negative bias cost may be added to an intra-predicted mode cost function used within the selection function, where the negative bias cost is based at least in part on the temporal distance between the picture and the nearest I-picture. In other words, the rate distortion selection function may be configured to have a relatively greater bias toward selecting the intra-predicted mode when the temporal distance is relatively smaller. This produces a randomized intra-refresh of various coding units that may assist in reducing I-pulsing. It is noted that the selection function and biasing may differ between P-pictures and B-pictures. The biasing may be performed linearly, exponentially, or according to other functions with respect to the temporal distance.

The selection function of the compression module 120 may be adaptive in other ways to reduce I-pulsing. For example, the selection function may take into account a quantization factor and quantization difference between the inter-coded picture and an intra-coded picture, whether the coding unit is in a particular region of coding units, content texture information, hypothetical reference decoder (HRD) buffer information, GOP length, and other factors. The quantization factor may determine the visual quality of the video stream. A large difference in quantization between an inter-predicted picture and its subsequent I-picture may result in I-pulsing. Thus, the selection function may be biased toward intra-prediction depending on the quantization.

In one embodiment, the selection function of the compression module 120 may be configured to designate particular regions of the picture for intra-prediction refresh. Intra-refreshing of regions of the picture may assist in improving video transmission quality of service over a lossy transmission medium, such as wireless video transmission or transmission of video over the Internet.

Picture content, such as textures or edges, may impact I-pulsing. For example, coding units depicting a clear sky may have fewer edges, while coding units depicting trees in a forest may have more edges. Fewer edges may result in an increased perception of I-pulsing, and the selection function may be biased toward intra-prediction when fewer edges are present. To this end, the compression module 120 may incorporate a content analyzer to provide picture content information to the selection function.

Additionally, the status of the HRD buffer in the memory module 130 may be an input to the selection function so as to avoid encoding a video stream that would result in underflow or overflow in a decoder buffer. For example, the selection function may avoid selecting intra-prediction mode depending on the HRD buffer status. Further, the GOP length may be a factor to the selection function as relatively long temporal distances between I-pictures may be associated with decreased I-pulsing in comparison to relatively smaller temporal distances between I-frames.

Figure 3:
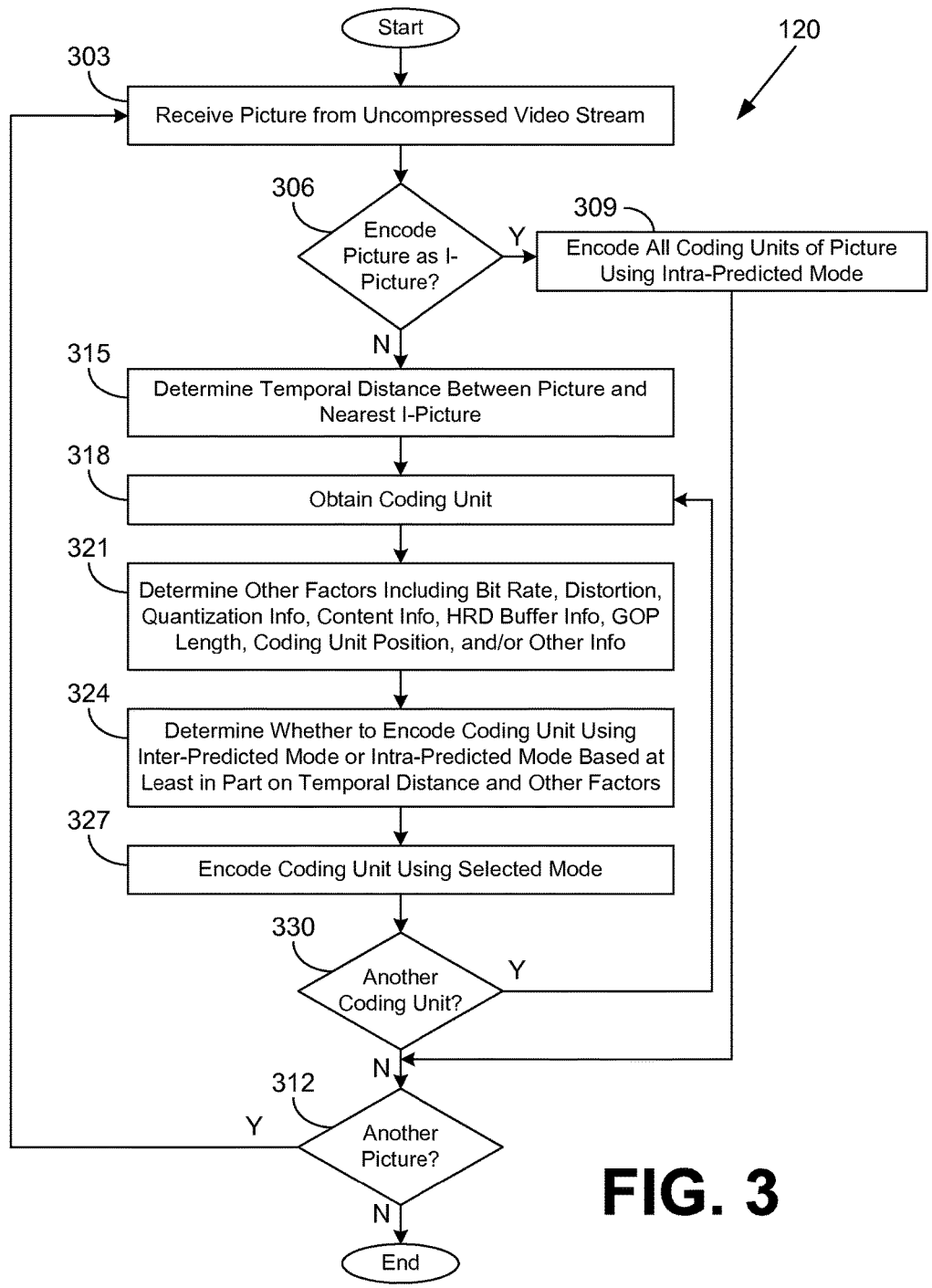
FIG. 3 is a flowchart that provides one example of the operation of a portion of an exemplary compression module employed in exemplary video processing device of FIG. 1A according to various embodiments.

FIG. 3 is a flowchart that provides one example of the operation of a portion of the exemplary compression module 120 (FIG. 1A) according to various embodiments. It is understood that the flowchart of FIG. 3 provides merely an example of the many different types of functional arrangements that may be employed to implement the operation of the portion of the compression module 120 as described herein. As an alternative, the flowchart of FIG. 3 may be viewed as depicting an example of steps of a method implemented in the compression module 120 according to one or more embodiments.

Beginning with (303), the compression module 120 receives a picture from an uncompressed video stream from a buffer in the memory module 130 (FIG. 1A). At (306), the compression module 120 determines whether the picture is to be encoded as an intra-coded picture. If the compression module 120 determines that the picture is to be encoded as an intra-coded picture, the compression module 120 moves to (309) and encodes all coding units of the picture using an intra-predicted mode. The compression module 120 then moves to (312) and determines whether another picture is to be processed in the video stream. If another picture remains to be processed, the compression module 120 returns to (303). Otherwise, the portion of the compression module 120 ends.

If, instead, the compression module 120 determines that the picture is to be encoded as an inter-coded picture (i.e., a B-frame or a P-frame), the compression module 120 moves from (306) to (315). At (315), the compression module 120 determines a temporal distance between the picture and the nearest I-picture. In other words, the compression module 120 determines the relative position of the picture within a GOP. At (318), the compression module 120 obtains a coding unit. At (321), the compression module 120 determines other factors such as bit rate, distortion from prediction errors, quantization factors and differences between pictures, content information such as edge information, HRD buffer information, GOP length, position of the coding unit within a region, and/or other information.

At (324), the compression module 120 determines whether to encode the coding unit using inter-predicted mode or intra-predicted mode based at least in part on the temporal distance and one or more of the other factors determined at (321). At (327), the compression module 120 encodes the coding unit using the selected mode, either intra-prediction or inter-prediction. At (330), the compression module 120 determines whether another coding unit remains to be processed for the current picture. If so, the compression module 120 then returns to (318). Otherwise, the compression module 120 continues to (312) and determines whether another picture is to be processed. If another picture is to be processed, the compression module 120 returns to (303). Otherwise, the portion of the compression module 120 ends.

Figure 4:
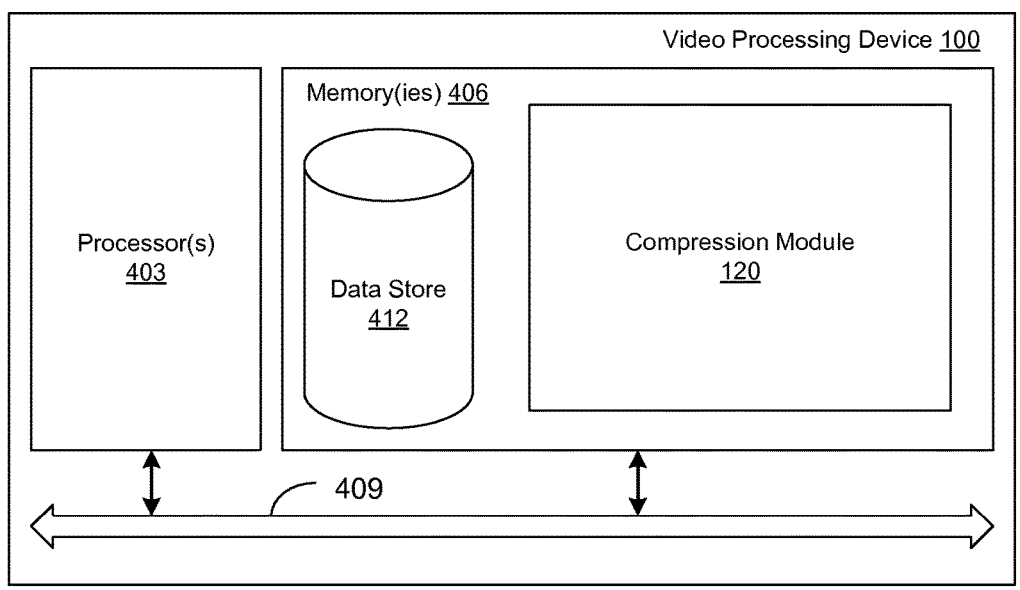
FIG. 4 is a schematic block diagram of the exemplary video processing device of FIG. 1A according to various embodiments of the present disclosure.

FIG. 4 is a schematic block diagram of the exemplary video processing device 100 (FIG. 1A) according to various embodiments of the present disclosure. The video processing device 100 includes at least one processor circuit, for example, having a processor 403 and a memory 406, both of which are coupled to a local interface 409. The processor 403 may correspond to the processor module 110 (FIG. 1A), and the memory 406 may include the memory module 130 (FIG. 1A). To this end, the video processing device 100 may comprise, for example, at least one computing device or like device. The local interface 409 may comprise, for example, a data bus with an accompanying address/control bus or other bus structure as can be appreciated. The local interface 409 may be coupled to one or more display devices 318.

Stored in the memory 406 are both data and several components that are executable by the processor 403. In particular, stored in the memory 406 and executable by the processor 403 are the compression module 120 and potentially other systems. Also stored in the memory 406 may be a data store 412 and other data. In addition, an operating system may be stored in the memory 406 and executable by the processor 403.

It is understood that there may be other systems that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, assembly, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction. In one embodiment, the processor 403 and memory 406 may correspond to a system-on-a-chip.

Although the compression module 120 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the compression module 120. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the compression module 120, that comprises software or code can be embodied in any computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. In some embodiments, the computer-readable medium may include transitory media such as electromagnetic signals, optical signals, and so on. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
processing circuitry configured to:
receive a picture from a first group of pictures within a video stream, the first group of pictures defined as beginning with a first intra-predicted picture, the video stream comprising a second group of pictures following the first group of pictures, the second group of pictures defined as beginning with a second intra-predicted pictures, the picture to be encoded as an inter-coded picture;
determine a first distance between the picture and the first intra-predicted picture of the first group of pictures;
determine a second distance between the picture and the second intra-predicted picture of the second group of pictures;
determine a nearest intra-predicted picture using the first distance and the second distance;
determine a temporal distance between the picture and the nearest intra-coded picture;
for each coding unit of the picture to be encoded as an inter-coded picture,
select one of an inter-predicted mode or an intra-predicted mode according to a selection function using the temporal distance; and
encode the coding unit of the picture using the selected one of the inter-predicted mode or the intra-predicted mode.

2. The system of claim 1, wherein the selection function is configured to select the one of the inter-predicted mode or the intra-predicted mode based at least in part on a first prediction error for the coding unit associated with the inter-predicted mode and a second prediction error for the coding unit associated with the intra-predicted mode.

3. The system of claim 1, wherein the processing circuitry is configured to select the intra-predicted mode when the temporal distance is relatively smaller.

4. The system of claim 1, wherein the inter-coded picture is one of a P picture or a B picture, and the selection function is biased based at least in part on whether the picture is to be encoded as the P picture or the B picture.

5. The system of claim 1, wherein the selection function is biased based at least in part on a quantization difference between the picture and the nearest intra-coded picture.

6. The system of claim 1, wherein the selection function is biased based at least in part on whether the coding unit is included in a particular region of coding units in the picture.

7. A method, comprising:
receiving, by a video processing device, a picture from a first group of pictures within a video stream, the first group of pictures defined as beginning with a first intra-predicted picture, the video stream comprising a second group of pictures following the first group of pictures, the second group of pictures defined as beginning with a second intra-predicted pictures;
determining, by the video processing device, that the picture is to be encoded as an inter-coded picture;
determining, by the video processing device, a first distance between the picture and the first intra-predicted picture of the first group of pictures;
determining, by the video processing device, a second distance between the picture and the second intra-predicted picture of the second group of pictures;
determining, by the video processing device, a relative location of the picture within the first group of pictures using the first distance and the second distance;
selecting, by the video processing device, one of inter-prediction or intra-prediction to encode a pixel group within the picture to be encoded as the inter-coded picture based at least in part on the relative location of the picture within the first group of pictures; and
encoding, by the video processing device, the pixel group using the selected one of inter-prediction or intra-prediction.

8. The method of claim 7, wherein the relative location of the picture within the first group of pictures is determined by:
determining a nearest intra-predicted picture using the first distance and the second distance, and
determining a temporal distance between the picture and the nearest intra-coded picture.

9. The method of claim 8, wherein the selecting operation comprises selecting the intra-prediction in response to determining that the temporal distance is relatively smaller.

10. The method of claim 8, wherein the selecting operation is further based at least in part on a quantization difference between the picture and the nearest intra-coded picture.

11. The method of claim 7, wherein the selecting further comprises selecting the one of inter-prediction or intra-prediction based at least in part on a quantization factor associated with the encoding.

12. The method of claim 7, wherein the selecting further comprises selecting the one of inter-prediction or intra-prediction based at least in part on a first prediction error associated with inter-prediction and a second prediction error associated with intra-prediction.

13. The method of claim 7, wherein the selecting further comprises selecting the one of inter-prediction or intra-prediction based at least in part on whether the pixel group is included in a particular region of pixel groups in the picture.

14. The method of claim 7, wherein the pixel group corresponds to a macroblock.

15. The method of claim 7, wherein the inter-coded picture is a P picture or a B picture.

16. A non-transitory computer-readable medium embodying a program executable by processing circuitry, the program being configured to:
receive a frame from a first group of frames within an uncompressed video stream, the first group of frames defined as beginning with a first intra-predicted frame, the uncompressed video stream comprising a second group of frames following the first group of frames, the second group of frames defined as beginning with a second intra-predicted frame;
determine that the frame is to be encoded as an inter-coded frame;
determine a first distance between the frame and the first intra-predicted frame of the first group of frames;
determine a second distance between the frame and the second intra-predicted frame of the second group of frames;
determine a nearest intra-predicted frame using the first distance and the second distance;
for each coding unit in the frame:
select one of an inter-predicted mode or an intra-predicted mode using a bias factor corresponding to a temporal distance between the frame and the nearest intra-predicted frame within the uncompressed video stream; and
encode the coding unit using the selected one of the inter-predicted mode or the intra-predicted mode.

17. The non-transitory computer-readable medium of claim 16, wherein the program is further configured to select the one of the inter-predicted mode or the intra-predicted mode based at least in part on a quantization factor associated with the encoding.

18. The non-transitory computer-readable medium of claim 16, wherein the bias factor is configured to increasingly bias the selection toward the intra-predicted mode when the temporal distance is relatively smaller.

19. The non-transitory computer-readable medium of claim 16, wherein the bias factor is selected based at least in part on an encoding bitrate control.

20. The non-transitory computer-readable medium of claim 16, wherein the bias factor is selected based at least in part on a quantization difference between the frame and the nearest intra-coded frame.

* * * * *